United States Patent
Lightner et al.

(10) Patent No.: US 9,223,833 B2
(45) Date of Patent: Dec. 29, 2015

(54) METHOD FOR IN-LOOP HUMAN VALIDATION OF DISAMBIGUATED FEATURES

(71) Applicant: QBASE, LLC, Reston, VA (US)

(72) Inventors: Scott Lightner, Leesburg, VA (US); Rakesh Dave, Dayton, OH (US); Sanjay Boddhu, Dayton, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/558,237

(22) Filed: Dec. 2, 2014

(65) Prior Publication Data

US 2015/0154198 A1    Jun. 4, 2015

Related U.S. Application Data

(60) Provisional application No. 61/910,802, filed on Dec. 2, 2013.

(51) Int. Cl.
  *G06F 17/30* (2006.01)
  *G06F 17/22* (2006.01)

(52) U.S. Cl.
  CPC ........ *G06F 17/3053* (2013.01); *G06F 17/2247* (2013.01); *G06F 17/30289* (2013.01)

(58) Field of Classification Search
  CPC .......... G06F 17/3053; G06F 17/30289; G06F 17/2247
  USPC .......................................................... 707/706
  See application file for complete search history.

(56) References Cited

U.S. PATENT DOCUMENTS

| | | |
|---|---|---|
| 6,128,660 A | 10/2000 | Grimm et al. |
| 6,178,529 B1 | 1/2001 | Short et al. |
| 6,266,781 B1 | 7/2001 | Chung et al. |

(Continued)

FOREIGN PATENT DOCUMENTS

WO    2013/003770 A2    1/2013

OTHER PUBLICATIONS

International Search Report and Written Opinion dated Mar. 6, 2015 corresponding to International Patent Application No. PCT/US2014/067993, 9 pages.

(Continued)

*Primary Examiner* — Jay Morrison
(74) *Attorney, Agent, or Firm* — Eric L. Sophir; Dentons US LLP

(57) ABSTRACT

Methods for providing in-loop validation of disambiguated features are disclosed. The disclosed methods may include disambiguating features in unstructured text that may use co-occurring features derived from both the source document and a large document corpus. The disambiguating systems may include multiple modules, including a linking on-the-fly module for linking the derived features from the source document to the co-occurring features of an existing knowledge base. The system for disambiguating features may allow identifying unique entities from a knowledge base that includes entities with a unique set of co-occurring features, which in turn may allow for increased precision in knowledge discovery and search results, employing advanced analytical methods over a massive corpus, employing a combination of entities, co-occurring entities, topic IDs, and other derived features. The disclosed method may use validation to provide input to the system for disambiguating features.

20 Claims, 3 Drawing Sheets

(56) References Cited

U.S. PATENT DOCUMENTS

| | | | |
|---|---|---|---|
| 6,353,926 B1 | 3/2002 | Parthesarathy et al. | |
| 6,738,759 B1 | 5/2004 | Wheeler et al. | |
| 6,832,373 B2 | 12/2004 | O'Neill | |
| 7,058,846 B1 | 6/2006 | Kelkar et al. | |
| 7,099,898 B1 | 8/2006 | Nakamura et al. | |
| 7,370,323 B2 | 5/2008 | Marinelli et al. | |
| 7,421,478 B1 | 9/2008 | Muchow | |
| 7,447,940 B2 | 11/2008 | Peddada | |
| 7,543,174 B1 | 6/2009 | van Rietschote et al. | |
| 7,681,075 B2 | 3/2010 | Havemose et al. | |
| 7,818,615 B2 | 10/2010 | Krajewski et al. | |
| 7,899,871 B1 | 3/2011 | Kumar et al. | |
| 8,055,933 B2 | 11/2011 | Jaehde et al. | |
| 8,122,026 B1 | 2/2012 | Laroco et al. | |
| 8,341,622 B1 | 12/2012 | Eatough | |
| 8,345,998 B2 | 1/2013 | Malik et al. | |
| 8,356,036 B2 | 1/2013 | Betchel et al. | |
| 8,375,073 B1 | 2/2013 | Jain | |
| 8,423,522 B2 | 4/2013 | Lang et al. | |
| 8,429,256 B2 | 4/2013 | Vidal et al. | |
| 8,726,267 B2 | 5/2014 | Li et al. | |
| 8,782,018 B2 | 7/2014 | Shim et al. | |
| 8,995,717 B2 | 3/2015 | Cheng et al. | |
| 9,009,153 B2 | 4/2015 | Khan et al. | |
| 9,025,892 B1 | 5/2015 | Lightner et al. | |
| 9,032,387 B1 | 5/2015 | Hill et al. | |
| 2001/0037398 A1 | 11/2001 | Chao et al. | |
| 2002/0031260 A1 | 3/2002 | Thawonmas et al. | |
| 2002/0165847 A1 | 11/2002 | McCartney et al. | |
| 2002/0174138 A1 | 11/2002 | Nakamura | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 | 2/2004 | Landau et al. | |
| 2004/0049478 A1 | 3/2004 | Jasper et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2004/0243645 A1 | 12/2004 | Broder et al. | |
| 2005/0091211 A1 | 4/2005 | Vernau et al. | |
| 2005/0192994 A1 | 9/2005 | Caldwell et al. | |
| 2006/0101081 A1 | 5/2006 | Lin et al. | |
| 2006/0271524 A1* | 11/2006 | Tanne et al. | 707/3 |
| 2006/0294071 A1 | 12/2006 | Weare et al. | |
| 2007/0005639 A1 | 1/2007 | Gaussier et al. | |
| 2007/0100806 A1 | 5/2007 | Ramer et al. | |
| 2007/0156748 A1 | 7/2007 | Emam et al. | |
| 2007/0174289 A1 | 7/2007 | Utiger | |
| 2007/0175674 A1* | 8/2007 | Brinson et al. | 177/136 |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0260598 A1* | 11/2007 | Odom | 707/5 |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2008/0077570 A1 | 3/2008 | Tang et al. | |
| 2008/0126170 A1* | 5/2008 | Leck et al. | 705/9 |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0125510 A1* | 5/2009 | Graham et al. | 707/5 |
| 2009/0222395 A1 | 9/2009 | Light et al. | |
| 2009/0240682 A1 | 9/2009 | Balmin et al. | |
| 2009/0282021 A1* | 11/2009 | Bennett | 707/5 |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2009/0327252 A1* | 12/2009 | Zhang et al. | 707/4 |
| 2010/0077001 A1 | 3/2010 | Vogel et al. | |
| 2010/0138931 A1 | 6/2010 | Thorley et al. | |
| 2010/0161580 A1* | 6/2010 | Chipman et al. | 707/706 |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0071975 A1 | 3/2011 | Friedlander et al. | |
| 2011/0093471 A1 | 4/2011 | Brockway et al. | |
| 2011/0099163 A1 | 4/2011 | Harris et al. | |
| 2011/0119243 A1 | 5/2011 | Diamond et al. | |
| 2011/0125764 A1 | 5/2011 | Carmel et al. | |
| 2011/0161333 A1 | 6/2011 | Langseth et al. | |
| 2011/0282888 A1 | 11/2011 | Koperski et al. | |
| 2011/0296397 A1 | 12/2011 | Vidal et al. | |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0212081 A1* | 8/2013 | Shenoy et al. | 707/706 |
| 2013/0290232 A1 | 10/2013 | Tsytsarau et al. | |
| 2013/0303198 A1 | 11/2013 | Sadasivam et al. | |
| 2014/0013233 A1 | 1/2014 | Ahlberg et al. | |
| 2014/0022100 A1 | 1/2014 | Fallon et al. | |
| 2014/0156634 A1 | 6/2014 | Buchmann et al. | |
| 2014/0244550 A1 | 8/2014 | Jin et al. | |
| 2014/0280183 A1 | 9/2014 | Brown et al. | |
| 2014/0351233 A1 | 11/2014 | Crupi et al. | |
| 2015/0074037 A1 | 3/2015 | Sarferaz | |
| 2015/0154079 A1 | 6/2015 | Lightner et al. | |
| 2015/0154264 A1 | 6/2015 | Lightner et al. | |
| 2015/0154297 A1 | 6/2015 | Lightner et al. | |

OTHER PUBLICATIONS

International Search Report and Written Opinion of the International Searching Authority dated Mar. 3, 2015 corresponding to International Patent Application No. PCT/US2014/067921, 10 pages.

International Search Report and Written Opinion of the International Searching Authority dated Apr. 15, 2015 corresponding to International Patent Application No. PCT/US2014/068002, 10 pages.

International Search Report and Written Opinion dated Mar. 10, 2015 corresponding to International Patent Application No. PCT/US2014/067999, 10 pages.

Tunkelang, D., "Faceted Search," Morgan & Claypool Publ., 2009, pp. 1-79.

Schuth, A., et al., "University of Amsterdam Data Centric Ad Hoc and Faceted Search Runs," ISLA, 2012, pp. 155-160.

Tools, Search Query Suggestions using ElasticSearch via Shingle Filter and Facets, Nov. 2012, pp. 1-12.

International Search Report dated Apr. 15, 2015 corresponding to International Patent Application No. PCT/US2014/067994, 4 pages.

Written Opinion of the International Searching Authority dated Apr. 15, 2015 corresponding to International Patent Application No. PCT/US2014/067994, 9 pages.

International Search Report and Written Opinion dated Feb. 24, 2015 corresponding to International Patent Application No. PCT/US2014/067918, 10 pages.

* cited by examiner

METHOD FOR IN-LOOP HUMAN VALIDATION OF DISAMBIGUATED FEATURES

CROSS-REFERENCE TO RELATED APPLICATIONS

This application claims the benefit of U.S. Provisional Application No. 61/910,802, entitled "Method For In-Loop Human Validation Of Disambiguated Features," filed Dec. 2, 2013, which is hereby incorporated by reference in its entirety.

This application is related to U.S. patent application No. 14/557,794, entitled "Method For Disambiguated Features In Unstructured Text," filed Dec. 2, 2014, U.S. patent application No. 14/558,254, entitled "Design And Implementation Of Clustered In-Memory Database," filed Dec. 2, 2014, and U.S. patent application No. 14/557,931, entitled "Method Of Discovering And Exploring Feature Knowledge", filed Dec. 2, 2014; each of which are hereby incorporated by reference in their entirety.

FIELD OF THE DISCLOSURE

The present disclosure relates in general to in-memory databases and, more specifically, to computer based methods for validating disambiguated features.

BACKGROUND

Searching information about entities (i.e., people, locations, organizations) in a large amount of documents, including sources such as a network, may often be ambiguous, which may lead to imprecise text processing functions, imprecise association of features during a knowledge extraction, and, thus, imprecise data analysis.

State of the art systems use linkage based clustering and ranking in several algorithms like PageRank and the hyperlink-induced topic search (HITS) algorithm. The basic idea behind this and related approaches is that pre-existing links typically exist between related pages or concepts. A limitation of clustering-based techniques is that sometimes contextual information needed to disambiguate entities is not present in the context, leading to incorrectly disambiguated results. Similarly, documents about different entities in the same or superficially similar contexts may be incorrectly clustered together.

Other systems attempt to disambiguate entities by reference to one or more external dictionaries (or knowledge base) of entities. In such systems, an entity's context is compared to possible matching entities in the dictionary and the closest match is returned. A limitation associated with current dictionary-based techniques stems from the fact that entities may increase its number by each moment and, therefore, no dictionary may include a representation of all of the world's entities. Thus, if a document's context is matched to an entity in the dictionary, then the technique has identified only the most similar entity in the dictionary, and not necessarily the correct entity, which may be outside the dictionary.

Traditional search engines allow users to find just pieces of information that are relevant to an entity, and while millions or billions of documents may describe that entity the documents are generally not linked together. In most cases it may not be viable to try to discover a complete set of documents about a particular feature. Additionally, methods that pre-link data are limited to a single method of linking and are fed by many entity extraction methods that are ambiguous and are not accurate. These systems may not be able to use live feeds of data; they may not perform these processes on the fly. As a consequence the latest information is not used in the linking process.

One limitation of fully automated linking is that, the results provided by this type of systems are as good as the data coming into it. Therefore, if inaccurate data is provided to the system, inaccurate results may be provided.

Therefore, there is still a need of accurate entity disambiguation techniques that allows a precise data analysis.

SUMMARY

A method for in-loop validation of disambiguated features is disclosed. The method may include the generation of entity occurring records from an input, allowing the creation of new linking models that may give high confidence to the generated feature occurring records.

One aspect of the current disclosure is the application of in-memory analytics to records, where the analytic methods applied to the records and the level of precision of the methods may be dynamically selected by a user.

According to some embodiments, when a user starts a search, the system may score records against the one or more queries, where the system may score the match of one or more available fields of the records and may then determine a score for the overall match of the records. The system may determine whether the score is above a predefined acceptance threshold, where the threshold may be defined in the search query or may be a default value.

In further embodiments, fuzzy matching algorithms may compare records temporarily stored in collections with the one or more queries being generated by the system.

In some embodiments, numerous analytics modules may be plugged to the in-memory data base and the user may be able to modify the relevant analytical parameters of each analytics module through a user interface.

Other aspects of the present disclosure include a new linking on-the-fly module that treats input records with high confidence. Allowing validation of on-the-fly results of disambiguated features.

A method for in-loop validation of disambiguated features may include a more actively learning system which, by adding input, results may be improved therefore, filling the gaps of the provided knowledge.

In one embodiment, a method is disclosed. The method comprises receiving, by a search manager computer, a search query from a user device and submitting the search query to a search conductor computer module for processing, receiving, by the search manager computer, search query results from the search conductor computer, the search query results having one or more records matching one or more fields of the search query, and sending, by the search manager computer, the search query results to a disambiguation analytic computer for disambiguating the search query results by determining relatedness among individual record features and topic identifications (topic IDs) associated with each record in the search query results. The method further includes receiving, by the search manager computer, disambiguated search query results from the disambiguation analytic computer and forwarding the disambiguated search query results to the user device for providing input on the disambiguated search query results, and when the user device provides the input on the disambiguated search query results creating, by the search manager computer, a new input occurrence record including the input and storing the new input occurrence record in a knowledge base database, and adjusting, by the disambiguation analytic computer, one or more parameters of a disambiguation algorithm based on the input from the user device.

In another embodiment, a system is disclosed. The system comprises one or more server computers having one or more processors executing computer readable instructions for a plurality of computer modules including a search manager computer module configured to receive a search query from a user device. The search manager computer module being further configured to submit the search query to a search conductor computer module for processing, receive search query results from the search conductor computer module, the search query results having one or more records matching one or more fields of the search query, send the search query results to a disambiguation analytic computer module for disambiguating the search query results, the disambiguation analytic computer module being configured to determine relatedness among individual record features and topic identifications (topic IDs) associated with each record in the search query results, receive disambiguated search query results from the disambiguation analytic computer module and forward the disambiguated search query results to the user device for providing input on the disambiguated search query results. In the disclosed system, when the user device provides the input on the disambiguated search query results: the search manager computer module is further configured to create a new input occurrence record including the input and store the new input occurrence record in a knowledge base database, and the disambiguation analytic computer module is further configured to adjust one or more parameters of a disambiguation algorithm based on the input from the user device.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
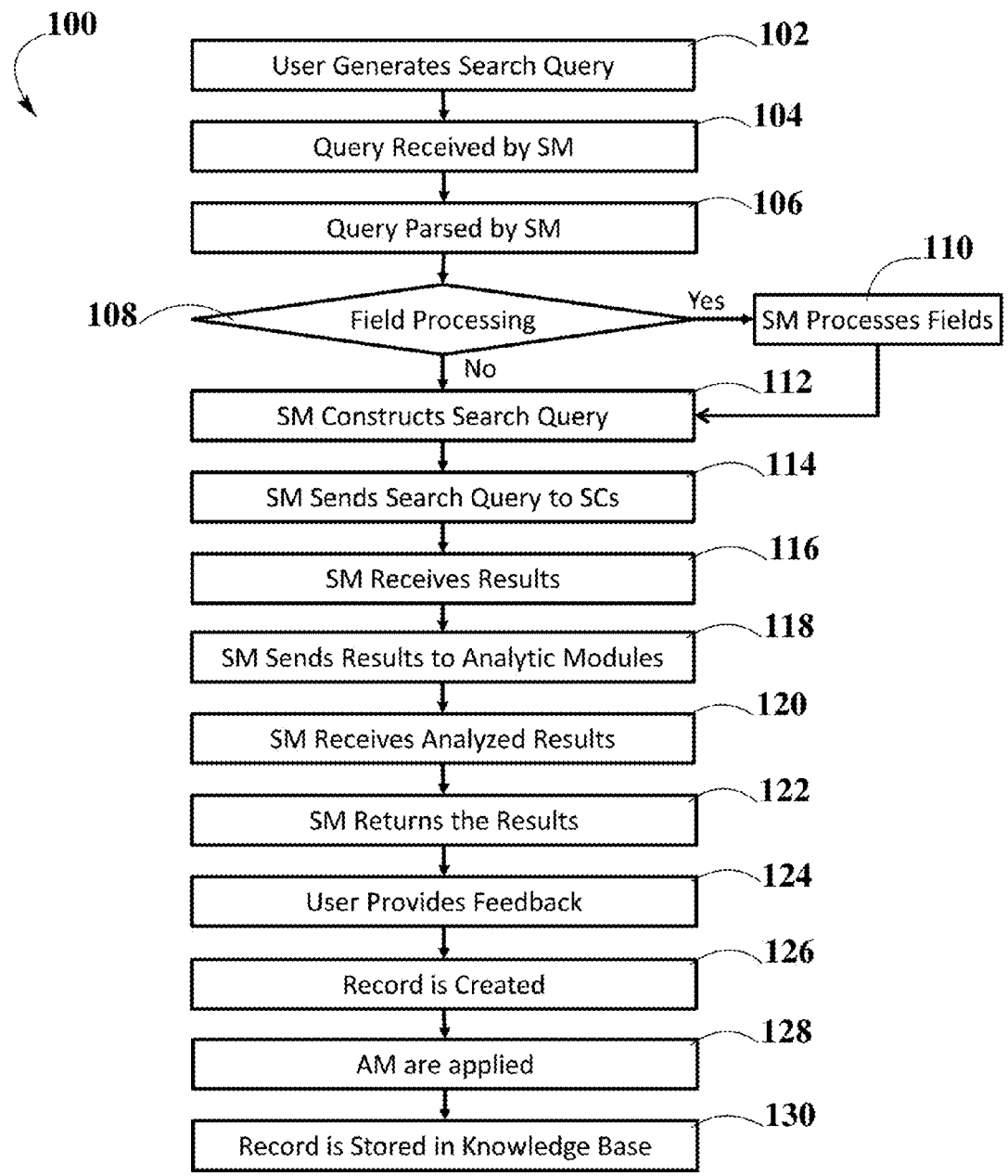
FIG. 1 is a flowchart of a computer based method for providing in-loop validation of disambiguated features, according to an embodiment.

As used herein, the following terms have the following definitions:

"Document" refers to a discrete electronic representation of information having a start and end.

"Corpus" refers to a collection of one or more documents.

"Feature" refers to any information which is at least partially derived from a document.

"Feature attribute" refers to metadata associated with a feature; for example, location of a feature in a document, confidence score, among others.

"Facet" refers to clearly defined, mutually exclusive, and collectively exhaustive aspects, properties or characteristics of a class, specific subject, topic or feature.

"Knowledge base" refers to a computer database containing disambiguated features or facets.

"Live corpus" refers to a corpus that is constantly fed as new documents are uploaded into a network.

"Memory" refers to any hardware component suitable for storing information and retrieving said information at a sufficiently high speed.

"Module" refers to a computer software component suitable for carrying out one or more defined tasks.

"Analytics Parameters" refers to parameters that describe the operation that an analytic module may have to perform in order to get specific results.

"Link on-the-fly module" refers to any linking module that performs data linkage as data is requested from the system rather than as data is added to the system.

"Node" refers to a computer hardware configuration suitable for running one or more modules.

"Cluster" refers to a set of one or more nodes.

"Query" refers to a request to retrieve information from one or more suitable databases.

"Record" refers to one or more pieces of information that may be handled as a unit.

"Collection" refers to a discrete set of records.

"Partition" refers to an arbitrarily delimited portion of records of a collection.

"Prefix" refers to a string of a given length that comprises of the longest string of key characters shared by all subtrees of then node and a data record field for storing a reference to a data record "Database" refers to any system including any combination of clusters and modules suitable for storing one or more collections and suitable to process one or more queries.

"Analytics Agent" or "Analytics Module" refers to a computer module configured to at least receive one or more records, process said one or more records, and return the resulting one or more processed records.

"Search Manager" or "SM" refers to a computer module configured to at least receive one or more queries and returns one or more search results.

"Search Conductor" or "SC" refers to a computer module configured to at least run one or more search queries on a partition and return the search results to one or more search managers.

"Sentiment" refers to subjective assessments associated with a document, part of a document, or feature.

"Topic" refers to a set of thematic information which is at least partially derived from a corpus.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments provide a computer-based disambiguation framework that incorporates a dynamic validation feature. The introduced framework extends traditional feature disambiguation systems based on a static knowledge base by providing an input mechanism to take verification of the disambiguated results and update the knowledge base on the fly, thereby creating an adaptive feature disambiguation system that adapts based on an electronic input describing the input. Additionally, the generated input is not only used to update new features to the knowledge base, but also make the linking models adapt their disambiguation process and logic accordingly. Further, the introduced framework introduces the concept of validating the verification with evidence from the live corpus by monitoring the clusters of extracted secondary features, supporting or not supporting the disambiguation assertions in the received input.

The embodiments describe systems and methods for providing in-loop validation of disambiguated features, which, in an embodiment, are performed by a central computer server system having one or more processors executing computer readable instructions corresponding to a plurality of special purpose computer modules described in FIGS. 1-2 below.

FIG. 1 is a flow chart describing a method 100 for providing in-loop validation of disambiguated features, according to an embodiment.

The process may start when a user device generates a search query, step 102. One or more user devices may be able to generate one or more search queries through one or more user interfaces. The user interfaces on the user devices may provide users with the option of selecting one or more of a set of analytic methods that may be applied to the results of the search query. The users may also be capable of selecting thresholds of acceptance of different levels.

Then, the query may be received, in step 104, by a search manager computer module. In this step, the one or more queries generated by the interaction of one or more users with one or more user interfaces may be received by one or more search manager computer modules. In one or more embodiments, the queries may be represented in a markup language, including XML and HTML. In one or more other embodiments, the queries may be represented in a structure, including embodiments where the queries are represented in JSON. In some embodiments, a query may be represented in compact or binary format.

Afterwards, the received queries may be parsed by the search manager computer module, step 106. This process may allow the system to determine if field processing is desired, step 108. In one or more embodiments, the system may be capable of determining if the process is required using information included in the query. In one or more other embodiments, the one or more search managers may automatically determine which one or more fields may undergo a desired processing.

If the system determined that field processing for the one or more fields is desired, the one or more search manager computer modules may apply one or more suitable processing techniques to the one or more desired fields, step 110. In one or more embodiments, suitable processing techniques may include address standardization, proximity boundaries, and nickname interpretation, amongst others. In some embodiments, suitable processing techniques may include the extraction of prefixes from strings and the generation of non-literal keys that may later be used to apply fuzzy matching techniques.

Then, when SM computer module constructs search query, step 112, one or more search managers may construct one or more search queries associated with the one or more queries. In one or more embodiments, the search queries may be constructed so as to be processed as a stack-based search.

Subsequently, SM may send search query to SC computer module, step 114. In some embodiments, one or more search manager computer modules may send the one or more search queries to one or more search conductor computer modules, where the one or more search conductors may be associated with collections specified in the one or more search queries.

The one or more search conductors may score records against the one or more queries, where the search conductors may score the match of one or more fields of the records and may then determine a score for the overall match of the records. The system may determine whether the score is above a predefined acceptance threshold, where the threshold may be defined in the search query or may be a default value. In one or more embodiments, the default score thresholds may vary according to the one or more fields being scored. If the search conductor determines in that the scores are above the desired threshold, the records may be added to a results list. The search conductor may continue to score records until it determines that a record is the last in the partition. If the search conductor determines that the last record in a partition has been processed, the search conductor may then sort the resulting results list. The search conductor may then return the results list to a search manager.

When SM receives and collates results from SCs, step 116, the one or more search conductors return the one or more search results to the one or more search managers; where, in one or more embodiments, said one or more search results may be returned asynchronously. The one or more search managers may then compile results from the one or more search conductors into one or more results list.

The one or more search managers may automatically determine which one or more fields may undergo one or more desired analytic processes. Then, the one or more search managers may send the search results to analytic computer modules, step 118. The one or more results lists compiled by one or more search managers may be sent to one or more analytics agents, where each analytics agent may include one or more analytics modules corresponding to one or more suitable processing techniques.

In some embodiments, analytics agents may include disambiguation modules, linking modules, link on-the-fly modules, or any other suitable modules and algorithms.

Within a suitable analytics agent a feature disambiguation process may be performed by a disambiguation computer module. This feature disambiguation process may include machine generated topic IDs, which may be employed to classify features, documents, or corpora. The relatedness of individual features and specific topic IDs may be determined using disambiguating algorithms. In some documents, the same feature may be related to one or more topic IDs, depending on the context of the different occurrences of the feature within the document.

The set of features (e.g., topics, events, entities, facts, among others) extracted from one record may be compared with sets of features from other documents, using disambiguating algorithms to define with a certain level of accuracy if two or more features across different documents are a single feature or if they are distinct features. In some examples, co-occurrence of two or more features across the collection of documents in the database may be analyzed to improve the accuracy of feature disambiguation process. In some embodiments, global scoring algorithms may be used to determine the probability of features being the same. In this process, different "extracted" secondary features are weighted appropriately, based on the training procedure performed on a large representative evaluation corpus.

In some embodiments, as part of the feature disambiguation process, a knowledge base may be generated within an in-memory database (MEMDB).

After processing, according to some embodiments, the one or more analytics agents may return one or more processed results lists, step 120, to the one or more search managers.

A search manager may return search results in step 122. In some embodiments, the one or more search managers may decompress the one or more results list and return them to the user interface that initiated the query. According to some embodiments, the search results may be temporarily stored in a knowledge base and returned to a user interface.

The knowledge base may be used to temporarily store clusters of relevant disambiguated features. When new documents may be loaded into the MEMDB, the new disambiguated set of features may be compared with the existing knowledge base in order to determine the relationship between features and determine if there is a match between the new features and previously extracted features. If the features compared match, the knowledge base may be updated and the ID of the matching features may be returned. If the features compared do not match with any of the already extracted features, a unique ID is assigned to the disambiguated entity or feature, and the ID is associated with the cluster of defining features and stored in within the knowledge base of the MEMDB.

When a user receives search results through a user interface, the user may be able to analyze the clusters of disambiguated feature and their related features. After the analysis, the user may provide input, in step 124, stating what kind of error or misinterpretation of data the user may have found. With this information a new feature occurrence record, step 126, may be created, which may be labeled as a generated input record. Then the feature occurrence record may undergo a validation process, in which analytics modules may be applied, step 128, to find out if there is overwhelming evidence that disproves the generated input. If such evidence is not found, the feature occurrence record may be stored in the knowledge base in step 130.

Although the exemplary embodiment recites that input can be received from a user selection on a user interface of a user device, it is intended that the input can be received automatically from a user device or other computing device without requiring any user selection. The input may be provided based upon an established set of rules or parameters.

New linking modules may be used when including generated feature occurrence records in a set of aggregated results to be processed. The new linking modules may be designed to assign higher confidence scores to validated relationships, and also perform on-the-fly re-training of existing linking modules, by adjusting the weights for each individual secondary features, that are contributing towards the disambiguation process. Thus, the generated input is used to update new features to the knowledge base and also make the linking models adapt their disambiguation process and logic accordingly.

Link On-the-Fly (OTF) Processing

Figure 2:
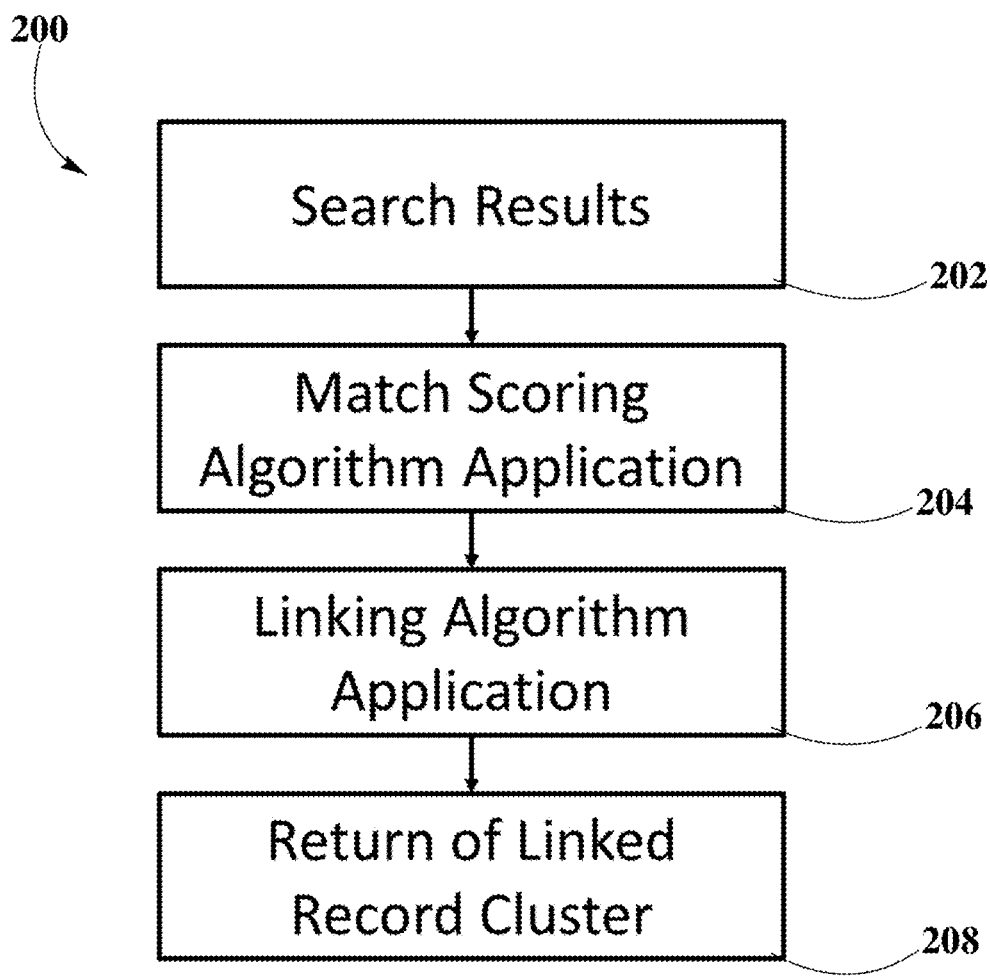
FIG. 2 is a flowchart of a process executed by a link on-the-fly module, according to an embodiment.

FIG. 2 is a flowchart of a method 200 executed by a link OTF computer module, which may be employed in search method for providing in-loop validation of disambiguated features described above in connection with FIG. 1, according to an embodiment. Link OTF process 200 may be capable of constantly evaluating, scoring, linking, and clustering a feed of information. Link OTF process 200 may perform dynamic records linkage using multiple algorithms. In step 202, search results may be constantly fed into link OTF computer module. In step 204, the input of data may be followed by a match scoring algorithm application, where one or more match scoring algorithms may be applied simultaneously in multiple search nodes of the MEMDB while performing fuzzy key searches for evaluating and scoring the relevant results, taking in account multiple feature attributes, such as string edit distances, phonetics, and sentiments, among others.

Afterwards, a linking algorithm application step 206 may be executed to compare all candidate records, identified during match scoring algorithm application in step 204, to each other. Linking algorithm application step 206 may include the use of one or more analytical linking algorithms capable of filtering and evaluating the scored results of the fuzzy key searches performed inside the multiple search nodes of the MEMDB. In some examples, co-occurrence of two or more features across the collection of identified candidate records in the MEMDB may be analyzed to improve the accuracy of the process. Different weighted models and confidence scores associated with different feature attributes may be taken into account for linking algorithm application in step 206.

After linking algorithm application step 206, the linked results may be arranged in clusters of related features and returned, as part of return of linked records clusters in step 208.

Figure 3:
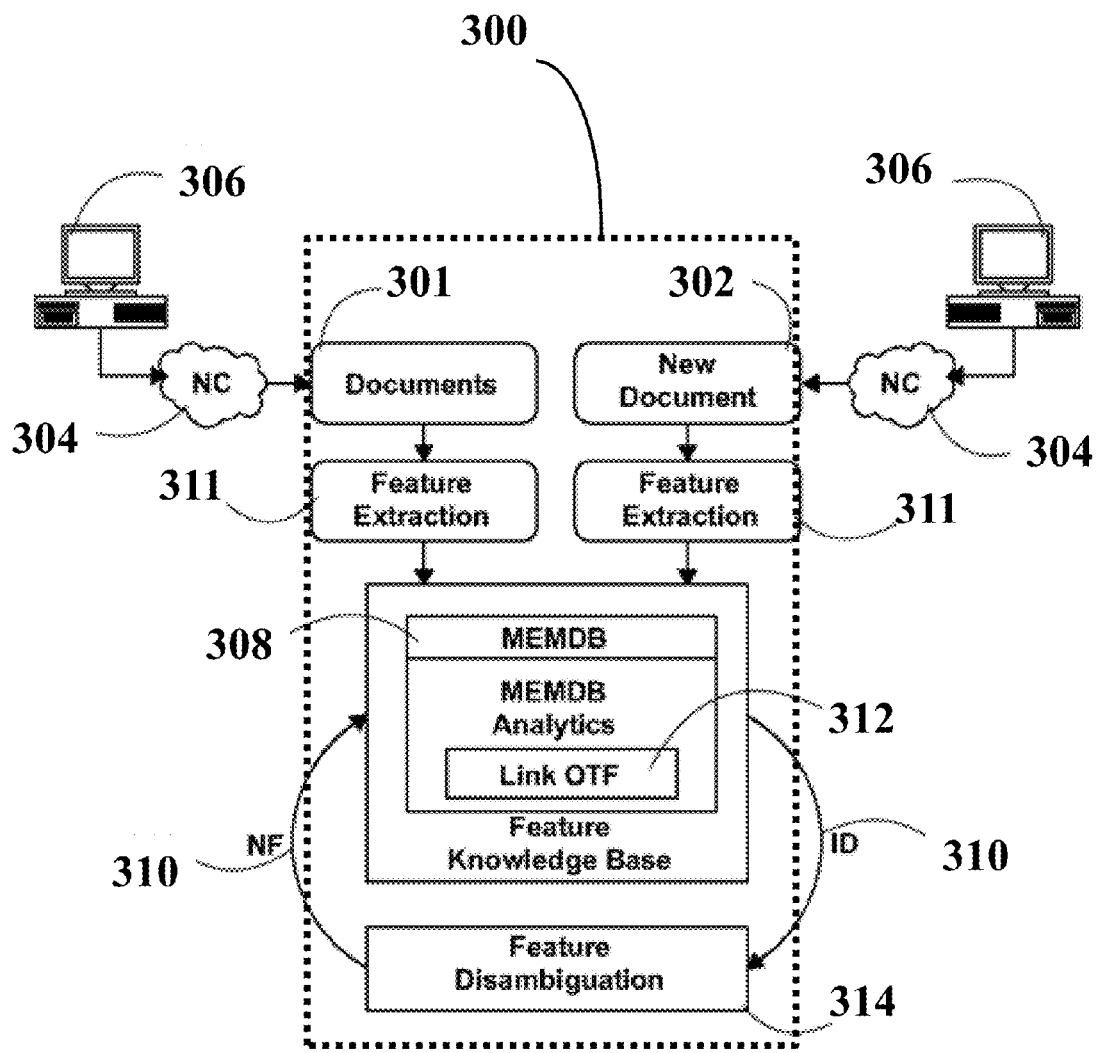
FIG. 3 is an illustrative diagram of a system employed for implementing the method for disambiguating features, according to an exemplary embodiment

FIG. 3 is an illustrative diagram of an embodiment of a system 300 for disambiguating features in unstructured text. The system 300 hosts an in-memory database and comprises one or more nodes.

According to an embodiment, the system 300 includes one or more processors executing computer instructions for a plurality of special-purpose computer modules 301, 302, 311, 312, and 314 (discussed below) to disambiguate features within one or more documents. As shown in FIG. 3, the document input modules 301, 302 receive documents from internet based sources and/or a live corpus of documents. A large number of new documents may be uploaded by the second into the document input module 302 through a network connection 304. Therefore, the source may be constantly getting new knowledge, updated by user workstations 306, where such new knowledge is not pre-linked in a static way. Thus, the number of documents to be evaluated may be infinitely increasing.

MEMDB 308 may facilitate a faster disambiguation process, may facilitate disambiguation process on-the-fly, which may facilitate reception of the latest information that is going to contribute to MEMDB 308. Various methods for linking the features may be employed, which may essentially use a weighted model for determining which entity types are most important, which have more weight, and, based on confidence scores, determine how confident the extraction and disambiguation of the correct features has been performed, and that the correct feature may go into the resulting cluster of features. As shown in FIG. 3, as more system nodes are working in parallel, the process may become more efficient.

According to various embodiments, when a new document arrives into the system 300 via the document input module 301, 302 through a network connection 304, feature extraction is performed via the extraction module 311 and, then, feature disambiguation may be performed on the new document via the feature disambiguation sub-module 314 of the MEMDB 308. In one embodiment, after feature disambiguation of the new document is performed, the extracted new features 310 may be included in the MEMDB to pass through link OTF sub-module 312; where the features may be compared and linked, and a feature ID of disambiguated feature 310 may be returned to the user as a result from a query. In addition to the feature ID, the resulting feature cluster defining the disambiguated feature may optionally be returned.

MEMDB computer 308 can be a database storing data in records controlled by a database management system (DBMS) (not shown) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

System 300 comprises the search manager computer module and disambiguation analytic computer module as machine-readable instructions executed by a processor on one or more servers or computing devices. These modules may be hosted on a single server or may each function as a separate computer.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

Various embodiments provide a computer executed feature disambiguation technique that employs an evolving and efficiently linkable feature knowledge base that is configured to store secondary features, such as co-occurring topics, key phrases, proximity terms, events, facts and trending popularity index. The disclosed embodiments may be performed via a wide variety of linking algorithms that can vary from simple conceptual distance measure to sophisticated graph clustering approaches based on the dimensions of the involved secondary features that aid in resolving a given extracted feature to a stored feature in the knowledge base. Additionally, embodiments can introduce an approach to evolves the existing feature knowledge base by a capability that not only updates the secondary features of the existing feature entry, but also expands it by discovering new features that can be appended to the knowledge base.

In a first example, the exemplary method for providing in-loop validation of disambiguated features is applied. In this example a user initiates a search with the name "John Steint", the results return 6 different disambiguated features with the same name. The user decides that two of them are the same "John Steint", the input is processed and the feature occurrence record is stored in the knowledge base. The feature occurrence record stored relates the features associated to the two "John Steint" features that were merged.

In a second example, the exemplary method for providing in-loop validation of disambiguated features is applied. In this example a user initiates a search with the name "John Steint", the results return 2 different disambiguated features with the same name. The user decides that one of them is actually two different "John Steint" and the related features are separated into 2 groups, the input is processed and the feature occurrence record is stored in the knowledge base. The feature occurrence records stored states that there is no relationship between the features associated to the two "John Steint" features that were separated.

In a third example, an exemplary application of method for in-loop validation of disambiguated features, where the feature to be disambiguated may be an image.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
in response to receiving, by a search manager computer, a search query from a user device:
submitting, by the search manager computer, the search query to a search conductor computer module for processing;
receiving, by the search manager computer, search query results from the search conductor computer module, wherein the search query results having one or more records matching one or more fields of the search query, wherein the search query results are based at least in part on the search query;
sending, by the search manager computer, the search query results to a disambiguation analytic computer for disambiguating the search query results by determining relatedness among individual record features and topic identifications (topic IDs) associated with each record in the search query results, wherein the disambiguation analytic computer comprises a main memory storing an in-memory database, wherein the disambiguation analytic computer comprises a linking module which links disambiguation data, in real-time, as the disambiguation data is requested by the search manager computer from the disambiguation analytic computer, wherein the in-memory database is coupled to the linking module, wherein a scoring algorithm is used to determine a probability of at least two individual record features being the same;
receiving, by the search manager computer, disambiguated search query results from the disambiguation analytic computer;
forwarding, by the search manager computer, the disambiguated search query results to the user device for providing an input on the disambiguated search query results; and
in response to receiving, by the search manager computer, the input on the disambiguated search query results from the user device:
creating, by the search manager computer, a new feature occurrence record in a knowledge base database, wherein the new feature occurrence record including the input, wherein the in-memory database comprises the knowledge base database,
storing, by the search manager computer, the new feature occurrence record in the knowledge base database, and
adjusting, by the disambiguation analytic computer, one or more parameters of a disambiguation algorithm based on the input from the user device, wherein the disambiguation algorithm involves at least the linking module.

2. The method of claim 1 wherein the disambiguation analytic computer assigns a confidence score to the new feature occurrence record based on the input from the user device.

3. The method of claim 1 wherein the disambiguation analytic computer adjusts weights associated with the individual record features in the search query results based on the input from the user device.

4. The method of claim 1 wherein the user device includes a user interface that provides an option to select one or more of a set of disambiguation algorithms.

5. The method of claim 4 wherein the user interface provides an option to select a threshold of acceptance for at least one of the individual record features and the topic IDs in the search query results.

6. The method of claim 1 wherein the search query is constructed using a markup language.

7. The method of claim 6 wherein the markup language is one of XML and HTML.

8. The method of claim 1 wherein the search query is constructed in a binary format.

9. The method of claim 1 wherein the search manager computer module validates the input from the user device prior to storing the new feature occurrence record in the knowledge base database.

10. The method of claim 1 wherein the search manager computer processes the search query via one or more processes selected from the group consisting of: address standardization, proximity boundaries, and nickname interpretation.

11. A system comprising:
one or more server computers comprising a main memory storing an in-memory database, wherein the one or more server computers having one or more processors coupled to the main memory and executing computer readable instructions for a plurality of computer modules including:
a search manager computer module configured to:
in response to a receipt of a search query from a user device:
submit the search query to a search conductor computer module for processing;
receive search query results from the search conductor computer module, wherein the search query results having one or more records matching one or more fields of the search query, wherein the search query results are based at least in part on the search query;
send the search query results to a disambiguation analytic computer module for disambiguating the search query results, wherein the disambiguation analytic computer module is configured to determine relatedness among individual record features and topic identifications (topic IDs) associated with each record in the search query results, wherein the disambiguation analytic computer module is coupled to a linking module which is configured to link disambiguation data, in real-time, as the disambiguation data is requested by the search manager computer module from the disambiguation analytic computer module, wherein the in-memory database is coupled to the linking module, wherein a scoring algorithm is used to determine a probability of at least two individual record features being the same;
receive disambiguated search query results from the disambiguation analytic computer module;
forward the disambiguated search query results to the user device for providing an input on the disambiguated search query results; and in response to a receipt of the input on the disambiguated search query results from the user device:

create a new feature occurrence record in a knowledge base database, wherein the new feature occurrence record including the input, wherein the in-memory database comprises the knowledge base database, store the new feature occurrence record in the knowledge base database, wherein the disambiguation analytic computer module is configured to adjust one or more parameters of a disambiguation algorithm based on the input from the user device, wherein the disambiguation algorithm involves at least the linking module.

12. The system of claim 11 wherein the disambiguation analytic computer module is configured to assign a confidence score to the new feature occurrence record based on the input from the user device.

13. The system of claim 11 wherein the disambiguation analytic computer module is configured to adjust weights associated with the individual record features in the search query results based on the input from the user device.

14. The system of claim 11 wherein the user device includes a user interface that provides an option to select one or more of a set of disambiguation algorithms.

15. The system of claim 14 wherein the user interface provides an option to select a threshold of acceptance for at least one of the individual record features and the topic IDs in the search query results.

16. The system of claim 11 wherein the search query is constructed using a markup language.

17. The system of claim 16 wherein the markup language is one of XML and HTML.

18. The system of claim 11 wherein the search query is constructed in a binary format.

19. The system of claim 11 wherein the search manager computer module is configured to validate the input from the user device prior to storing the new feature occurrence record in the knowledge base database.

20. The system of claim 11 wherein the search manager computer module is configured to process the search query via one or more processes selected from the group consisting of: address standardization, proximity boundaries, and nickname interpretation.

\* \* \* \* \*